(12) United States Patent
Xia et al.

(10) Patent No.: US 10,146,077 B2
(45) Date of Patent: Dec. 4, 2018

(54) DEVICE FOR ELIMINATING SPLICED BORDER/BEZEL OF CRYSTAL LIQUID DISPLAY SCREEN BY MEANS OF EDGE DISPLAY

(71) Applicants: Zhanmin Xia, Shanghai (CN);
Weikang Ding, Shanghai (CN)

(72) Inventors: Zhanmin Xia, Shanghai (CN);
Weikang Ding, Shanghai (CN)

( * ) Notice: Subject to any disclaimer, the term of this patent is extended or adjusted under 35 U.S.C. 154(b) by 311 days.

(21) Appl. No.: 15/076,666

(22) Filed: Mar. 22, 2016

(65) Prior Publication Data
US 2016/0202523 A1    Jul. 14, 2016

Related U.S. Application Data

(63) Continuation of application No. PCT/CN2014/083680, filed on Aug. 5, 2014.

(30) Foreign Application Priority Data

Sep. 24, 2013   (CN) .......................... 2013 1 0437834

(51) Int. Cl.
  *G02F 1/1333* (2006.01)
  *G09F 9/35* (2006.01)
  *G09F 9/302* (2006.01)

(52) U.S. Cl.
  CPC ........ *G02F 1/13336* (2013.01); *G09F 9/3026* (2013.01); *G09F 9/35* (2013.01)

(58) Field of Classification Search
  CPC .................................................. G02F 1/13336
  See application file for complete search history.

(56) References Cited

U.S. PATENT DOCUMENTS

| | | | |
|---|---|---|---|
| 2002/0008675 A1 | 1/2002 | Mayer, III | |
| 2008/0037284 A1 | 2/2008 | Rudisill | |
| 2012/0001830 A1* | 1/2012 | Xia | .......................... G09G 3/20 |
| | | | 345/1.2 |

FOREIGN PATENT DOCUMENTS

| | | |
|---|---|---|
| CN | 201218850 U | 4/2009 |
| CN | 201893080 U | 7/2011 |

(Continued)

*Primary Examiner* — James Dudek
(74) *Attorney, Agent, or Firm* — Wayne & Ken, LLC; Tony Hom

(57) ABSTRACT

A device for eliminating spliced borders/bezels of a liquid crystal display screen by means of edge display, which comprises an edge display unit is arranged on the spliced border/bezel of the liquid crystal display screen, a dodging layer is arranged on the edge display unit to serve as a display surface of the edge display unit, and the dodging layer and a displayable area of the liquid crystal display screen are synthesized and fused to display an original input video image. The edge display unit is fused with the video image of the displayable area of the liquid crystal display screen in an area source mode, and the edge display unit is infused into the liquid crystal display video image well through converting an LED point light source in edge display into an area source; a large view angle of 75 degrees (an included angle with the normal of the liquid crystal display screen) is allowed, that is, the spliced liquid crystal display screen is watched within the range of 150 degrees, and the spliced image is made to tend to be complete after video images originally lost are restored to be displayed; the overall seamless display screen is formed, the technical requirements for transporting, using and splicing are greatly reduced, and application of the seamless display screen is expanded.

11 Claims, 28 Drawing Sheets

(56) References Cited

FOREIGN PATENT DOCUMENTS

| | | |
|---|---|---|
| CN | 102262842 A | 11/2011 |
| CN | 103295481 A | 9/2013 |

\* cited by examiner

US 10,146,077 B2

DEVICE FOR ELIMINATING SPLICED BORDER/BEZEL OF CRYSTAL LIQUID DISPLAY SCREEN BY MEANS OF EDGE DISPLAY

CROSS-REFERENCE TO RELATED APPLICATIONS

This application is a continuation of International Patent Application No. PCT/CN2014/083680 with an international filing date of Aug. 5, 2014 designating the United States, now pending and further claims priority benefits to Chinese Patent Application No. 201310437834.4 filed Sep. 24, 2013. The content of the aforementioned applications including any intervening amendments thereto, is incorporated herein by reference.

TECHNICAL FIELD

The present invention relates to a scheme for integrating edge display and liquid crystal display, so that the integrated liquid crystal screen will be a seamless display system with full area and large view. Besides, the spliced liquid crystal screen will achieve seamless display effect.

BACKGROUND OF THE PRESENT INVENTION

Large screen display of digital high definition (2K) and digital ultra high definition (4K) are playing more and more important role. However, the display screen is with black lattice/bezel having no video after it is spliced into large screen. FIG. 1 is four spliced liquid display screens with 2 rows and 2 columns (the diagonal is 120 inches after splicing). If a circle having 4 gaps and cross (the same width with black lattice/bezel) is input into the center of spliced screens with 2 rows and 2 columns (see FIG. 2), the 4 gaps, cross and video image having the equivalent width with black lattice/bezel cannot be displayed (see FIG. 3). If the input signal is displayed completely, it is unacceptable as the input video image is divided and the width of black lattice/bezel becomes a part of video image (see FIG. 4). So images of input video are replaced or occupied by the width of black lattice/bezel after splicing display screen with black border/bezel having no video. It is a fatal flaw for data display, curve, track, global positioning and the like.

And many obstacles are existed in some aspects such as investment scale, production equipment, material strength, yield, transportation and installation to manufacture overall display screen over 120 inches and also it is not economical. Cost per area of overall screen with 80~120 inches will grow exponentially with the size of screen, and the cost of spliced screen will increase linearly with splicing area, that is, the cost per area is basically unchanged.

Different types of display screen used for splicing black lattice/bezel having no video are as follows.
1.0.0 Liquid Crystal Display (LCD) Screen LCD is the most widely used display screen, and it has reached digital ultra high definition (4K). However, the edge with signal circuit is around displayable area of LCD screen c, and no video is displayed on the edge (one side is 2~4 mm, both sides are 4~8 mm after splicing). No matter how narrow, the edge is, the black lattice/bezel still remains after the LCD screens are spliced into large screen (see FIG. 5). Two modes are carried out to avoid these black lattice/bezel, that is, passive mode and active mode.

1.1.0 Passive Mode

The black lattice/bezel is covered visually by using optical principle of reflection or refraction for passive mode, the originally input image occupied by the black lattice/bezel cannot be restored to be displayed. Generally, there are some types as follows.
1.1.1 Reflection of Light The originally black border a is covered by the reflector surface d with angle of 45 degrees of periphery and LCD screen c, for the repeated display e of video near the edge of the black border a in the displayable area of LCD screen c in the reflector surface with angle of 45 degrees, thereby a visual effect without black lattice/bezel is reached (see FIG. 6). However, the 4 gaps and cross of originally input video still cannot be displayed (see FIG. 7).
1.1.2 Amplification (see FIG. 8~12)

a) the originally LCD screen c is covered by a manufactured material having same size with the LCD screen and certain thickness using the transparent material f, and an arc is made around the edge of the transparent material f along the direction of thickness, the arc has effect of amplifying the video around the displayable area of the LCD screen c. (See FIG. 8)

b) a transparent arc cylinder h is manufactured directly, the arc cylinder is attached on the black border a of the LCD screen c after the LCD screen c is spliced.

For above modes, the amplifying effect of the arc for the video around the displayable area of the LCD screen has effect of partly covering the black lattice when watching from an angle perpendicular to the bottom side A of the arc.

But the black lattice/bezel of LCD screen is wider due to the amplification of the arc when watching from an angle not perpendicular to the bottom side B of the arc, and the width of black lattice/bezel will grow with the increase of the angle, FIG. 11 is a view angle of 30 degrees, FIG. 12 is a view angle of 45 degrees, and FIG. 13 is a view angle of 60 degrees.

While for LCD large screen having several meters, decade meters or even larger, it is impractical for every display area to watch from a perpendicular angle. So when watching the spliced large screen in the form of reflection of light, the wider black lattice/bezel than originally LCD screen will appear except the display area perpendicular to the bottom side of the arc, and some defects appear, a) The splicing quantity and size of liquid crystal display screen are limited.

b) The originally video image replaced or occupied by the black border/bezel cannot be restored to be displayed.

c) The watch mode is limited,
1.1.3 Optical Amplification Flat Panel

Based on the principle of optical fiber transmission, the optical amplification flat panel i is to transmit the pixel pitch of the light input layer (bottom layer) identically into the light output layer (top layer) with a certain equidistance, for a one-to-one correspondence between the bottom layer and pixels of LCD screen c, and the top layer is enlarged to the outer diameter having black border/bezel a of LCD screen (see FIG. 14).
1.1.4 White To avoid the visual impact of the black and the contrast between display area and the black, the black of black border/bezel is changed into white or silver gray for the impact reduction, however, when black elements are expressed by the originally input video, visual impact still remains for white border/bezel, 1.2.0 Active Mode For the active ode, the video image replaced or occupied by the black lattice/bezel is restored to be displayed, on the width surface of black border/bezel having no video, so that the video image restored to be displayed on the width surface of black border/bezel is fused with the video image on the displayable area of LCD screen into the video image as the originally input. This is an edge display, and the pixel need to be restored to be displayed can be realized by LED, OLED or corresponding circuit, the essentially difference with other modes of covering the black lattice/bezel is the video image replaced or occupied by the black lattice, bezel is restored to be displayed (see FIG. 15)

Besides above LCD screen, the black lattice/bezel of other display screens after splicing is demonstrated as follows.

2.0.0 Digital Light Processing (DLP) Display Screen

DLP is to manufacture the display screen using the mode of rear projection. The projection screen is fixed on the very thin frame end, so the black border/bezel a having no video of DLP is narrower (one side is 1.5 mm, both sides are 3 mm after splicing).

No matter how narrow the black border/bezel, the black lattice/bezel still remains for the DLP after splicing. And compared with LCD, DLP is the older generation of display technology with many limits and defects, such as low light, low resolution (unable to do high definition and ultra high definition), short lifetime, high maintenance cost, great thickness and need maintenance space at the rear.

3.0.0 Plasma Display Panel (PDP)

PDP is a self luminous pixel display technology, so these self luminous pixels can be manufactured on the very edge of display screen. However, these self luminous pixels still need to be supported, so the structure thickness supporting these self luminous pixels is the black border/bezel having no video (one side is 1.5 mm, both sides are 3 mm after splicing).

Meanwhile, PDP is with many limits and defects, such as burning pixel, low resolution (unable to do high definition and ultra high definition), low light, short lifetime, high price and great power consumption (see FIG. 17).

4.0.0 LED Screen

LED screen is very common. However, high definition (2K) display is difficult for LED display screen, and ultra high definition (4K) display is more difficult. The pixel pitch of LED display can reach 1.9 mm, for the digital high definition standard for screen with 1920×1080 resolution, the high definition (2K) video image can be completely displayed when the size of LED screen reach 2052×3648 mm, that is, (1.9×1920)×(1.9×1080), but some problems will appear.

a) The video image is beginning to be fuzzy when the high definition image is displayed on the screen with 2.0×3.6 meters, b) 2 million three-color LED particles are needed for the LED screen with 2.0×3.6 meters, that is, 277 thousand independent three-color LED particles are needed per square meter, which is great challenge to the price, power consumption, heat, uniformity, reliability and lifetime.

5.0.0 OLED

OLED is a new display technology, however, it is during experimental stage at present. Large screen with several meters or decade rater manufactured by OLED remains to be seen.

In conclusion, seamless splicing cannot be truly achieved by LCD, DLP and PDP with black border/bezel for the moment, that is, the spliced LCD, DLP and PDP will produce black lattice/bezel.

SUMMARY OF THE PRESENT INVENTION

The purpose of the present invention is to solve above existing problems for the black lattice/bezel having no video after the display screen is spliced into large screen, by providing a scheme for integrating edge display and liquid crystal display, and because the edge display of active mode is fused with liquid crystal display to display originally input video image, and the technical scheme of the present invention is utilized, so that seamless splicing is possible. For the active mode, the video image replaced or occupied by the black lattice/bezel is restored to be displayed on the width surface of black border/bezel having no video, so that the video restored to be displayed on the width surface of black border/bezel is fused with the video on the LCD screen into the input video as the originally input, and a seamless display system is established. And the display video on the width surface of black border/bezel is realized by LED, OLED or corresponding circuit.

The present invention relates to a device for eliminating a spliced border/bezel of a liquid crystal display screen by means of edge display, characterized in that an edge display unit is arranged on the spliced border/bezel of the liquid crystal display screen, a dodging layer is arranged on the edge display unit to serve as a display surface of the edge display unit, and the dodging layer and a displayable area of the liquid crystal display screen are synthesized and fused to display an original input video image. Wherein the frame of liquid crystal display screen is a composite structure of an inner frame and an outer frame, the dodging layer is black, transparent thin shelled and long strips of a dodging body, the edge display unit is a flexible circuit of LED display unit, the inner bottom of the dodging layer on the edge display unit is connected with the inner frame of composite structure of liquid crystal display screen, and the outer side face of the dodging layer on the edge display unit is connected with the outer frame of composite structure of liquid crystal display screen. The flexible circuit of LED display unit of edge display unit is leaded from the front side of liquid crystal display panel with backlight to its back side, and it is connected with corresponding driving circuit and, control circuit. An arc is arranged on the inner frame and outer frame of the dodging layer. A stitch is arranged on the inner bottom of the dodging layer as per certain distance, a through-hole having same interval is arranged on the inner frame of liquid crystal screen, passing through the through-hole of inner frame, the stitches are thermo-compression bonded with the inner frame A clamping is arranged on the inner top of the dodging layer, which locates the relative position of LED of the edge display unit and the inner frame. The clamping is arranged beyond the included angle of 120 degrees between outside and bottom of LED illuminant of edge display unit. A groove is arranged on outer side face of the dodging layer, the groove is arranged beyond the included angle of 120 degrees between outside and bottom of LED illuminant of edge display unit. The largest outer diameter for superimposed thickness of inner frame, LED flexible circuit of the edge display unit and the outer frame is smaller than the display edge of the dodging layer. The outer frame of composite frame and the outer groove of the dodging layer are connected by a fastening. A coordinating through-hole of the inner frame, LED flexible circuit, of the edge display unit and the outer frame is arranged on the installation position with backlight liquid crystal panel, the inner frame, LED flexible circuit of the edge display unit and the outer frame is fixed on the liquid crystal panel with backlight by a fixed bolt in the coordinating through-hole. The backside of LED flexible circuit of the edge display unit is closely attached on the inner frame, so that LED can be heat radiated and conducted outwards. The conducting area of LED flexible circuit of the edge display unit is wrapped up by the dodging layer, so that LED flexible circuit of the edge display unit is insulated.

The advantages of the present invention is that the edge display unit is fused with the video image of the displayable area of the liquid crystal display screen in an area source mode and the edge display unit is infused into the liquid crystal display video image well through converting an LED point light source in edge display into an area source; a large view angle of 75 degrees (an included angle with the normal of the liquid crystal display screen) is allowed, that is, the spliced liquid crystal display screen is watched within the range of 150 degrees (the liquid crystal display screen has better display characteristics in a larger view), in the video image over 80%, edge display is not existed essentially (better correspondence exists between splicing liquid crystal display screen in the remained 20% video image); the edge display is 2 mm higher than the liquid crystal display screen, but the height difference is smaller than $1/1000$ from 2~3 meters, and will not be visual disorder, that is, it cannot be distinguished essentially, and the spliced image is made to tend to be complete after video images originally lost are restored to be displayed; the overall seamless display screen is formed, the technical requirements for transporting, using and splicing are greatly reduced, and application of the seamless display screen is expanded.

Figure 1:
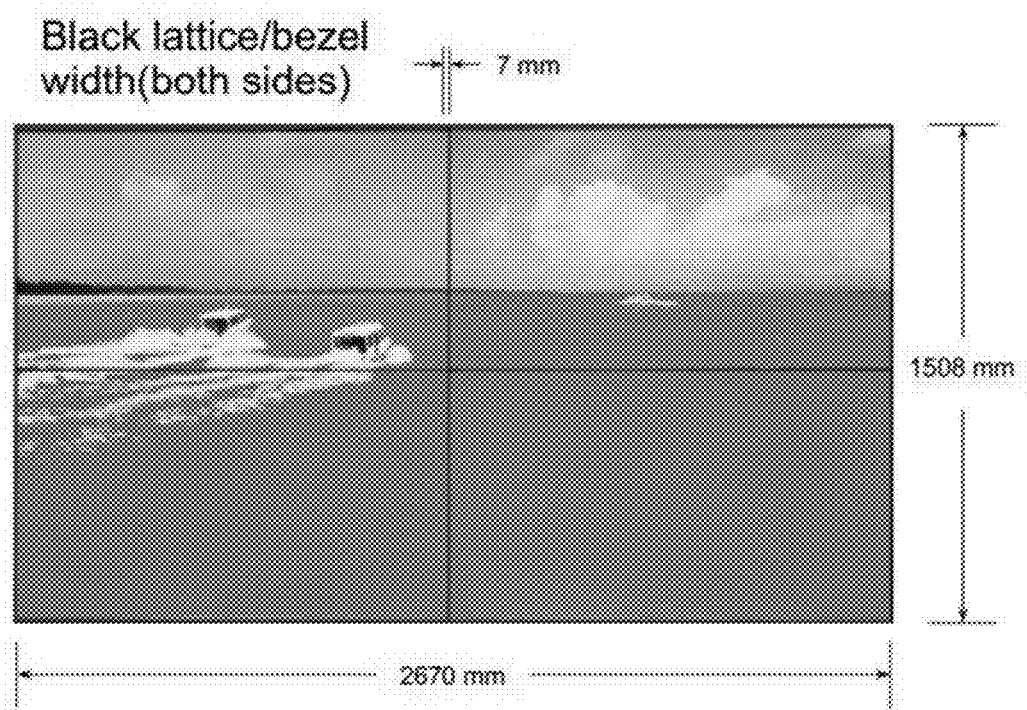
FIG. 1 is a splice liquid crystal display having black border/bezel and black lattice/bezel about 7 mm in the middle.
Figure 2:
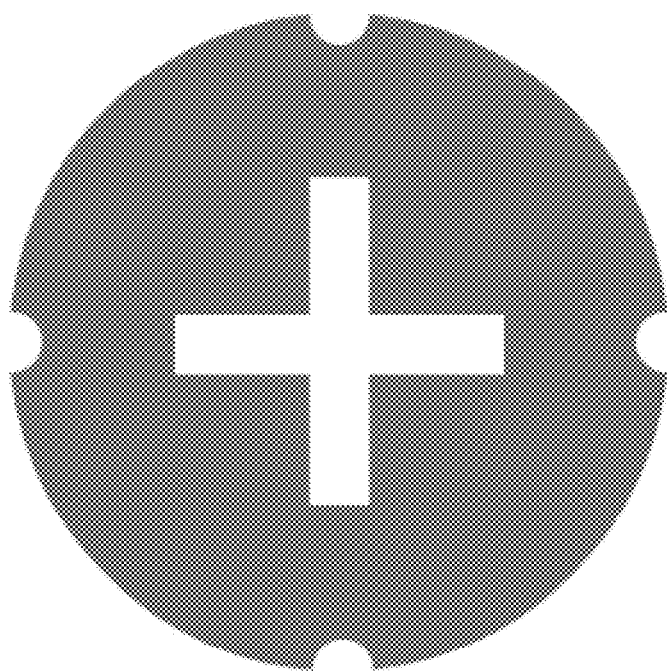
FIG. 2 is a circle having 4 gaps and cross, the width of gaps and cross is the same with that of black lattice/bezel.
Figure 3:
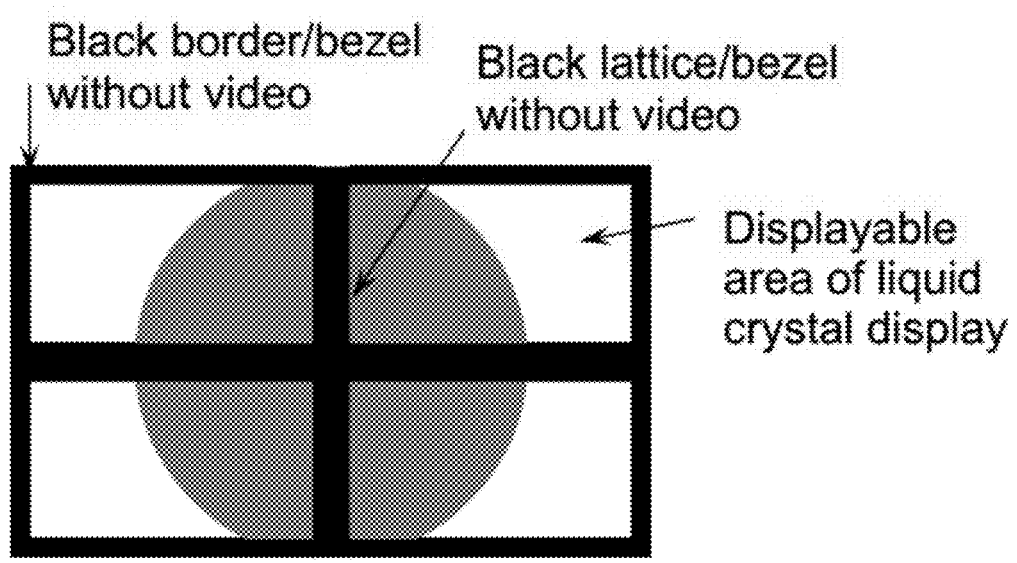
FIG. 3 is a video image display missing view of equivalent width of gaps, cross and black lattice/bezel.
Figure 4:
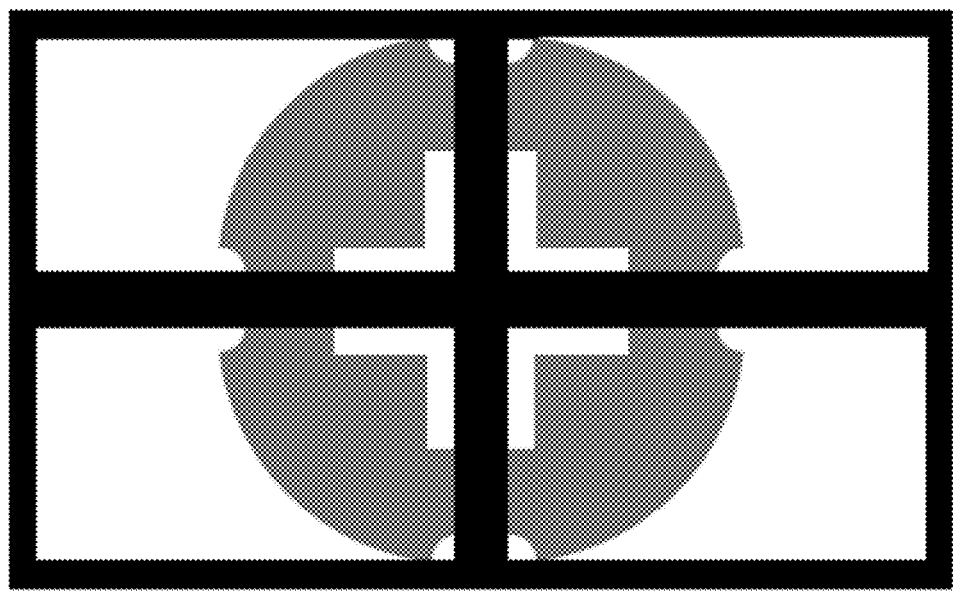
FIG. 4 is a complete display view of input video image, and the original video image is divided.
Figure 5:
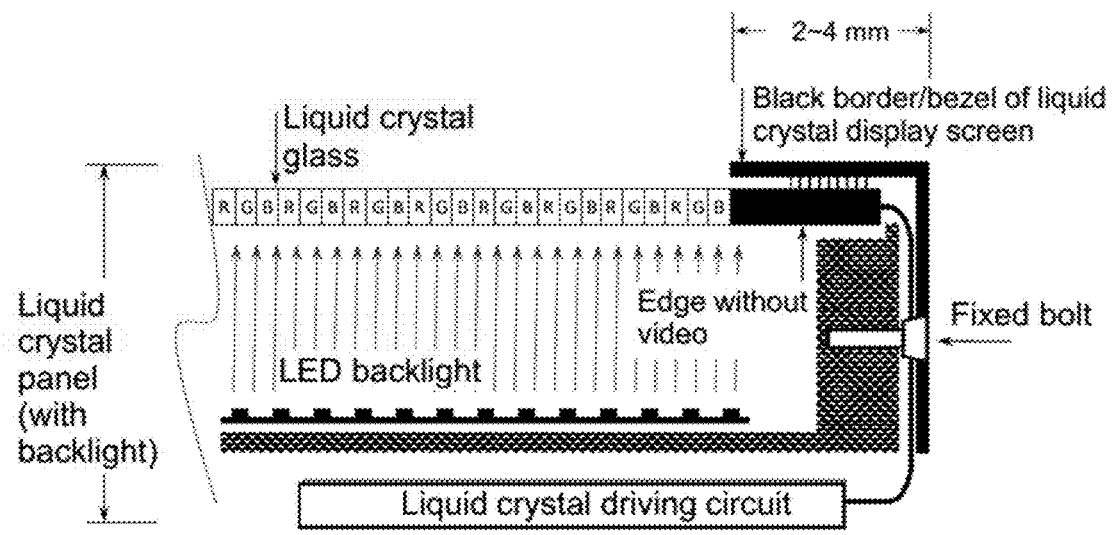
FIG. 5 is a classical section diagram of liquid crystal display panel.
Figure 6:
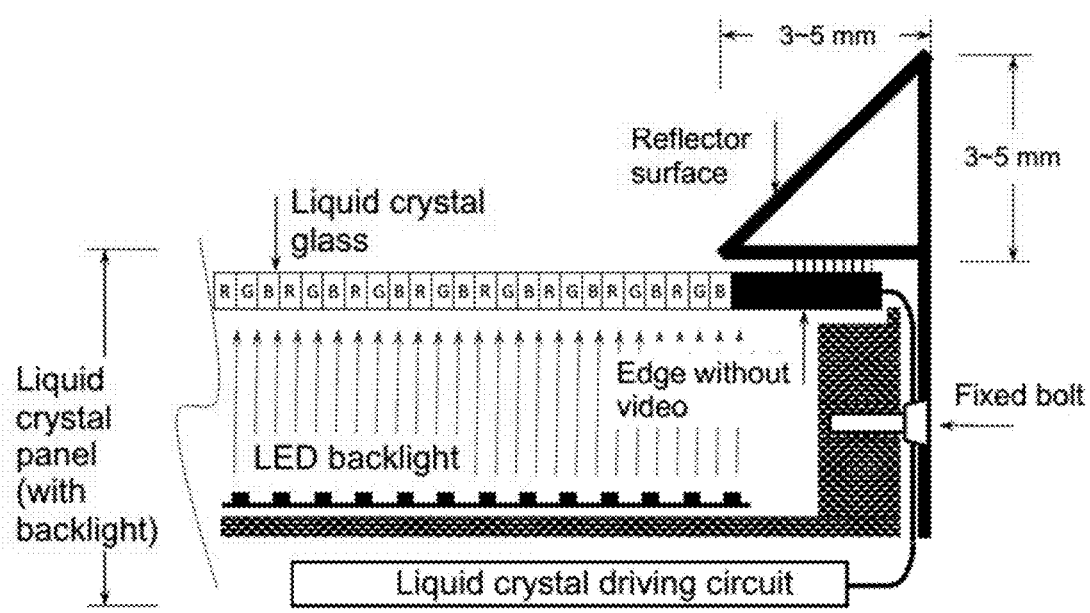
FIG. 6 is a reflector surface on black border/bezel of the liquid display screen.
Figure 7:
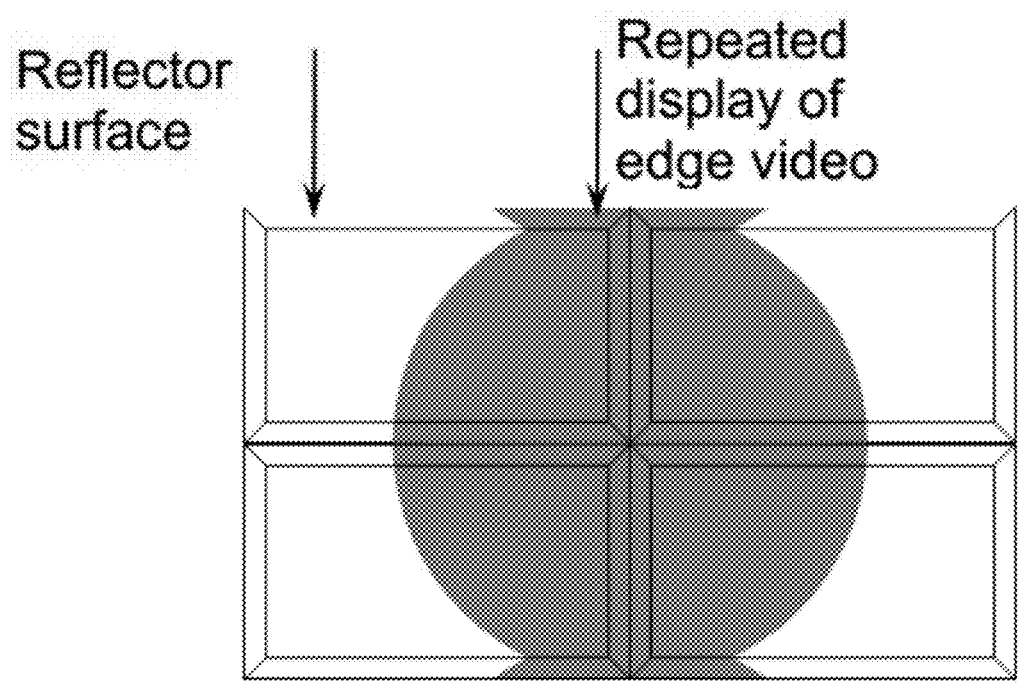
FIG. 7 is a repeated display view of reflected video image of border/bezel of liquid crystal display area.
Figure 8:
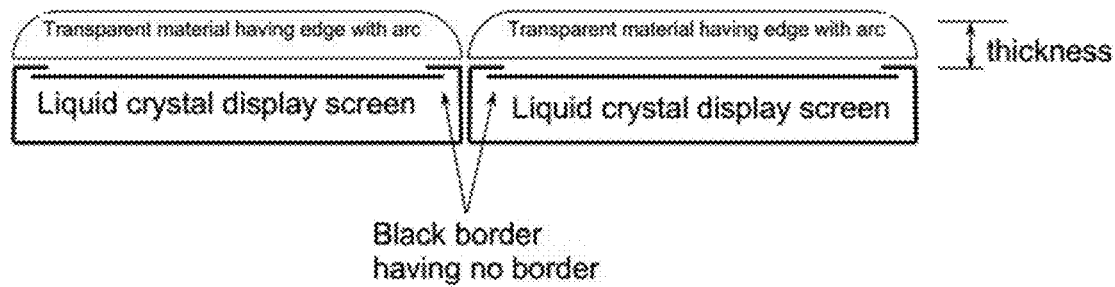
FIG. 8 is a view of fitting transparent flat plate with arc and liquid crystal screen.
Figure 9:
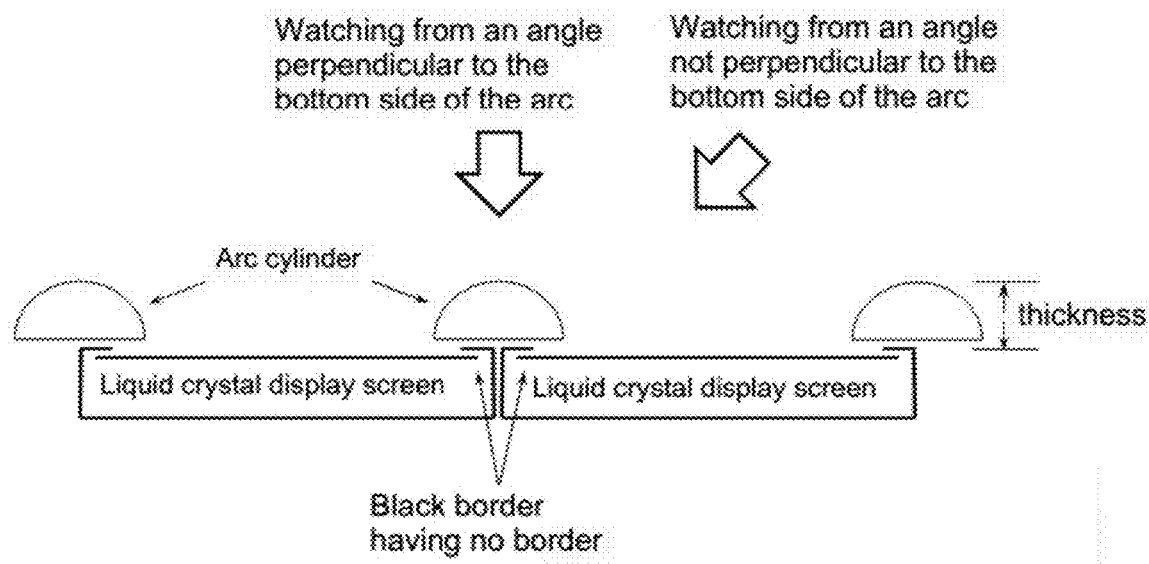
FIG. 9 is a view of fitting arc cylinder and liquid crystal screen.
Figure 10:
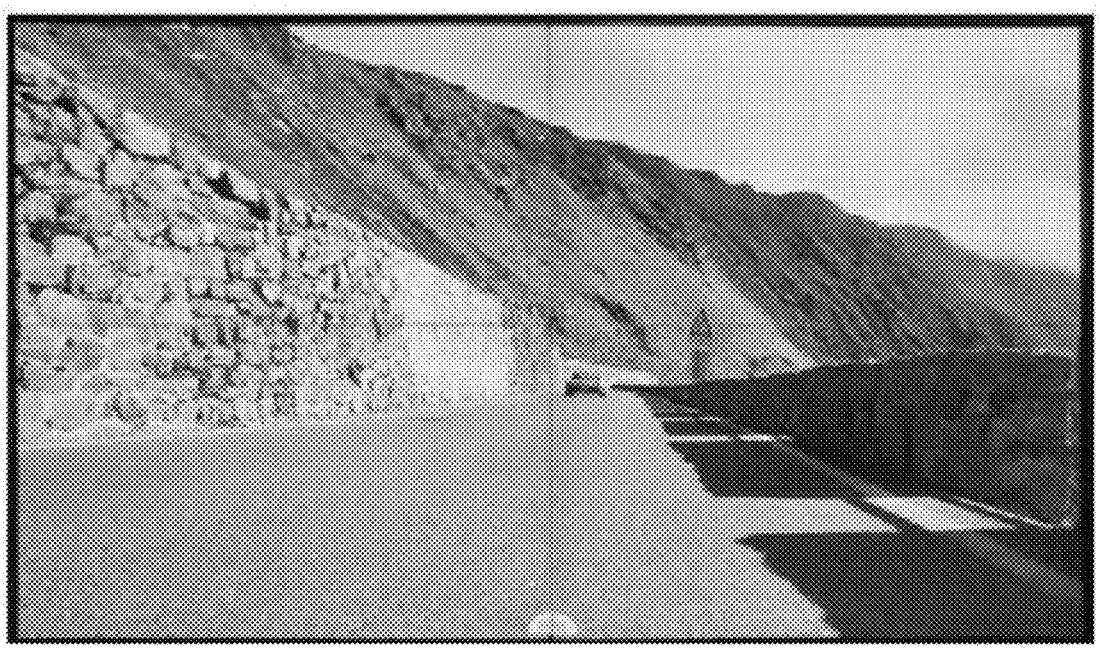
FIG. 10 is a view angle of 90 degrees with the bottom side of arc having the narrower black lattice/bezel of liquid crystal screen than before.
Figure 11:
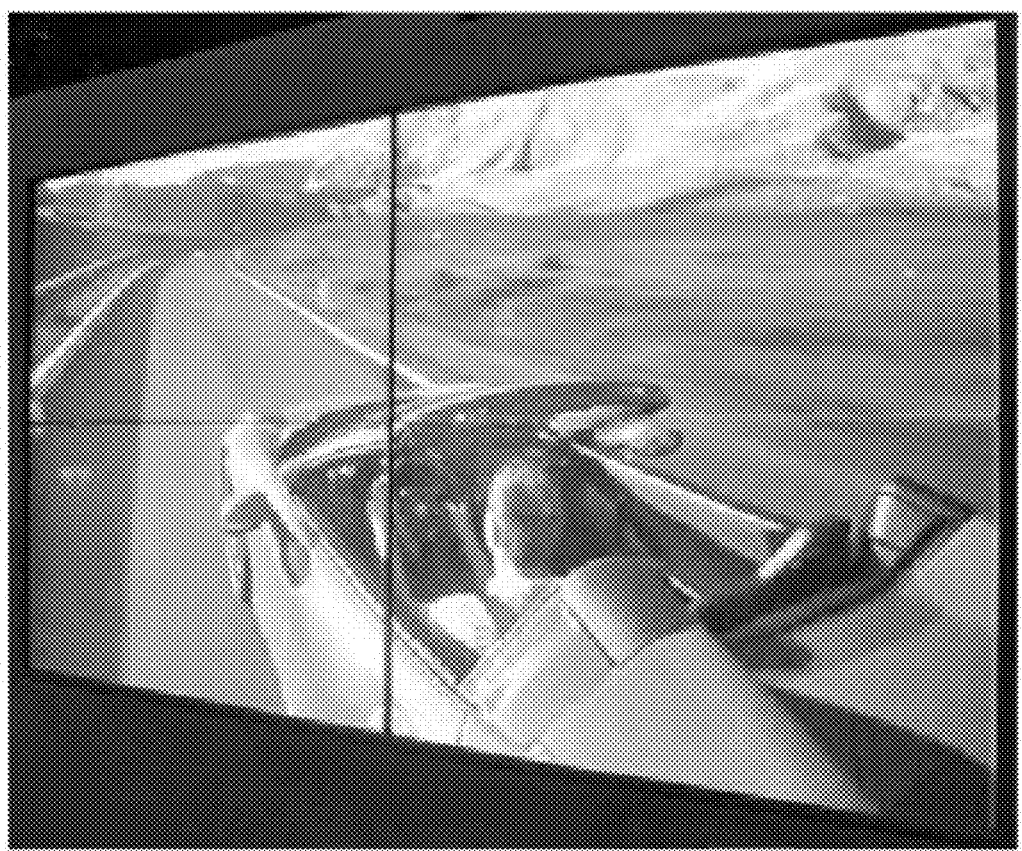
FIG. 11 is a view angle of 30 degrees with the normal of the bottom side of arc, having the wider black lattice/bezel of liquid crystal screen than before.
Figure 12:
FIG. 12 is a view angle of 45 degrees with the normal of the bottom side of arc, larger view, wider black lattice/bezel of liquid crystal screen.
Figure 13:
FIG. 13 is a view angle of 60 degrees with the normal of the bottom side of arc, larger view, wider black lattice/bezel of liquid crystal screen
Figure 14:
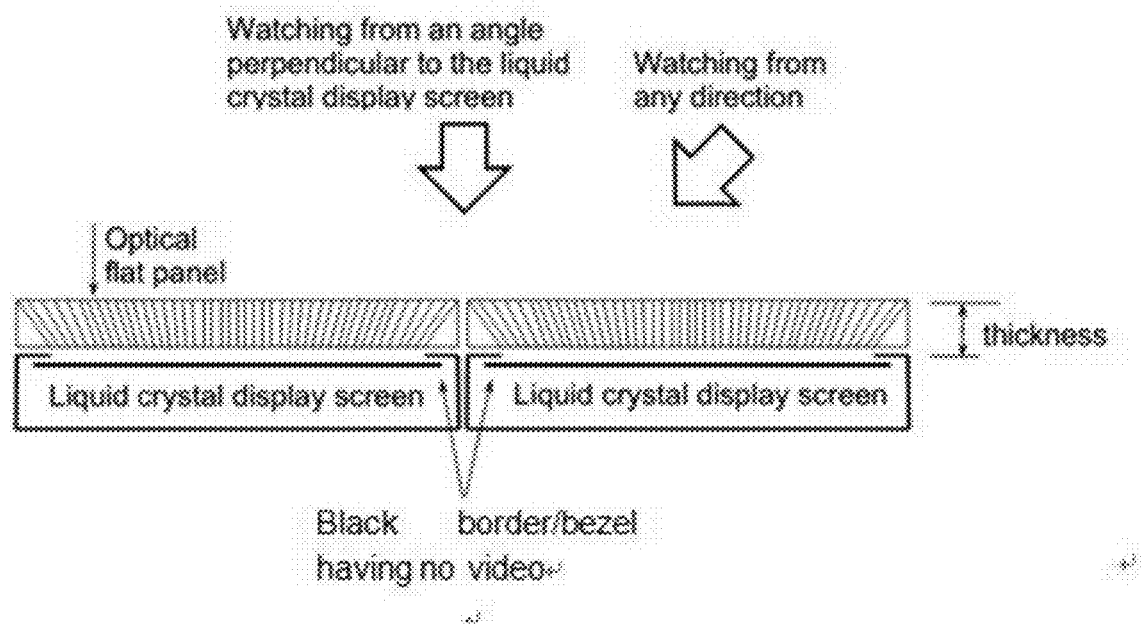
FIG. 14 is an optical amplification flat panel.
Figure 15:
FIG. 15 is a diagram of scheme for integrating edge display and liquid crystal display according to the present invention.
Figure 16:
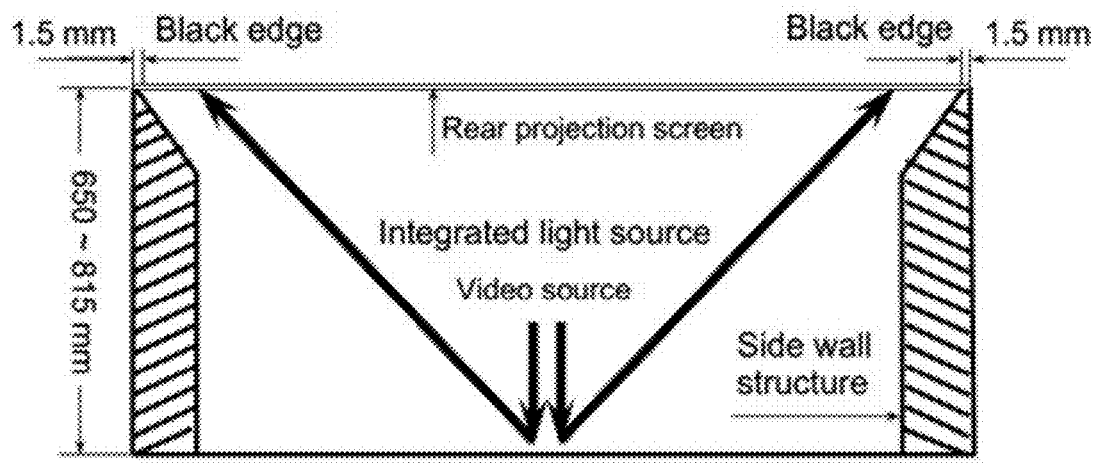
FIG. 16 is a schematic diagram of DLP display screen.
Figure 17:
FIG. 17 is the black lattice/bezel of spliced plasma display panel.
Figure 18:
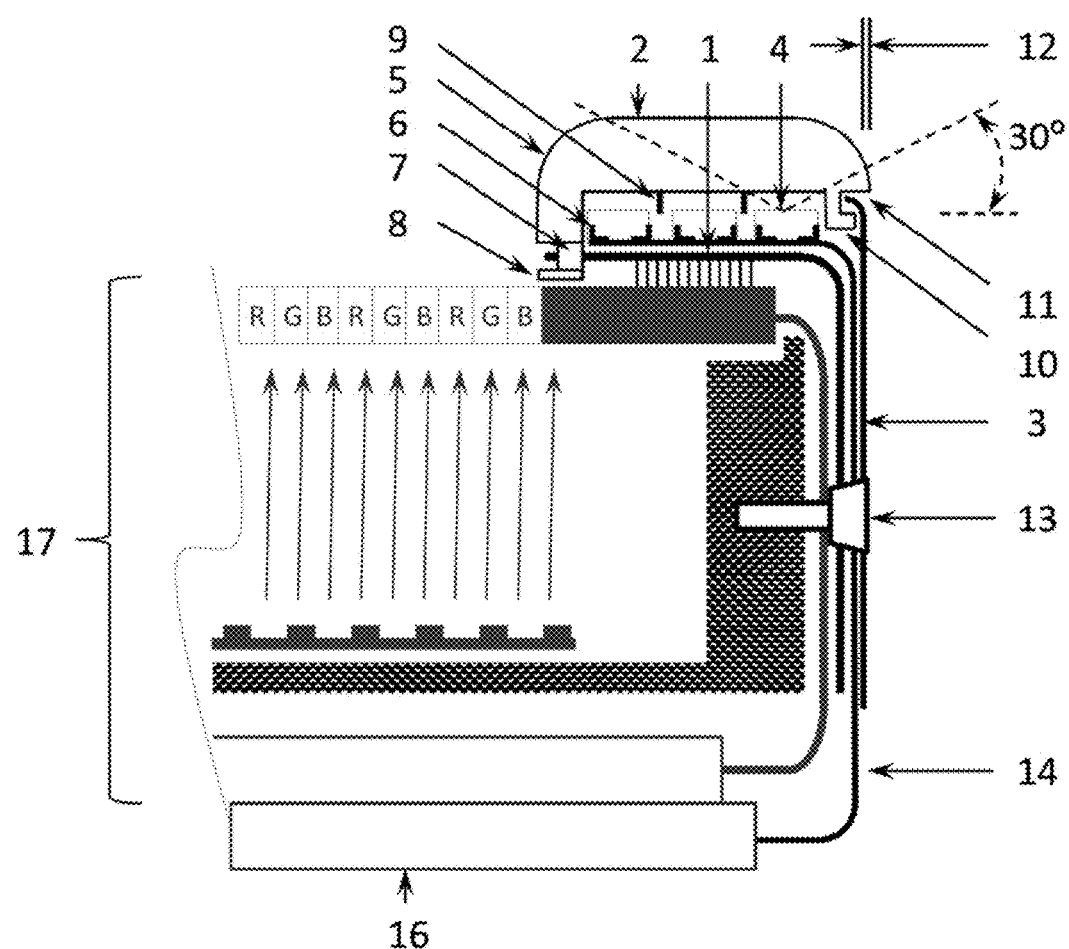
FIG. 18 is a basic principle diagram of the present invention.

The detailed explanation is made as follows with reference to embodiments and drawings.

DETAILED DESCRIPTION OF PREFERRED EMBODIMENTS

A device for eliminating spliced borders/bezels of liquid crystal display screens by means of edge display, characterized in that an edge display unit is arranged on the spliced border/bezel of the liquid crystal display screen, a dodging layer is arranged on the edge display unit to serve as a display surface of the edge display unit, and the dodging layer and a displayable area of the liquid crystal display screen are synthesized to display an original input video image. Wherein the border/bezel of liquid crystal display screen is a composite structure of the inner frame and the outer frame, the dodging layer is black transparent, thin shelled and long strips of a dodging body, the edge display unit is a flexible circuit of LED display unit, the inner bottom of the dodging layer on the edge display unit is connected with the inner frame of composite structure of liquid crystal display screen, and the outer side face of the dodging layer on the edge display unit is connected with the outer frame of composite structure of liquid crystal display screen. The flexible circuit of LED display unit of edge display unit is leaded from the front side of liquid crystal display panel with backlight to its back side, and it is connected with corresponding driving circuit and control circuit. An arc is arranged on the inner frame and outer frame of the dodging layer. A stitch is arranged on the inner bottom of the dodging layer as per certain distance, a through-hole having same interval is arranged on the inner frame of liquid crystal screen, passing through, the through-hole of inner frame, the stitches are thermo-compression bonded with the inner frame. A clamping is arranged on the inner top of the dodging layer, which locates the relative position of LED of the edge display unit and the inner frame. The clamping is arranged beyond the included angle of 120 degrees between outside and bottom of LED illuminant of edge display unit. A groove is arranged on outer side face of the dodging layer, the groove is arranged beyond the included angle of 120 degrees between outside and bottom of LED illuminant of edge display unit. The largest outer diameter for superimposed thickness of inner frame, LED flexible circuit of the edge display unit and the outer frame is smaller than the display edge of the dodging layer. The outer frame of composite frame and the outer groove of the dodging layer are connected by a fastening. A coordinating through-hole of the inner frame. LED flexible circuit of the edge display unit and the outer frame is arranged on the installation position with backlight liquid crystal panel, the inner frame, LED flexible circuit of the edge display unit and the outer frame is fixed on the liquid crystal panel with backlight by a fixed bolt in the coordinating through-hole. The backside of LED flexible circuit of the edge display unit is closely attached on the inner frame, so that LED can be heat radiated and conducted outwards. The conducting area of LED flexible circuit of the edge display unit is wrapped up by the dodging layer, so that LED flexible circuit of the edge display unit is insulated.

The present invention provides a scheme for integrating edge display into the width surface of black border/bezel of liquid crystal display screen whose size is about 2~4 mm characterized in that no new black border/bezel is added on the original width/span surface of black border/bezel of liquid crystal display screen, or no new area without video is produced, that is, after edge display is added on the width/span surface of originally black border/bezel of liquid crystal display screen, no display system having no video area exists when the largest outer diameter of the constructed whole screen any part in plane or each direction of hemisphere view of liquid crystal display plane, or the whole is a seamless display system. The edge display has following characteristics due to the scheme, the edge display is positioned on the liquid crystal panel with backlight precisely, so that the pixel of edge display is corresponding to that of liquid crystal display, and the edge display and liquid crystal display can be infused to display and synthesize originally input video image; besides, the edge display and the liquid crystal panel with backlight are integrated into a whole, which is transported installed and spliced as a whole, rather than attaching other components on the splicing large screen after completing the splicing of liquid crystal display screens with black border/bezel; moreover, there is no essentially difference with the liquid crystal display screen with black border/bezel in operation and use except the display effects, in this way, the edge display is also with characteristics of keeping liquid crystal glass just as the originally black border/bezel on the liquid crystal panel with backlight, and the same strength, rigidity and safety (the liquid crystal glass will not be damaged due to this); when the black image elements need to be expressed in the input video, it can be expressed in corresponding position of edge display; the circuit of edge display is completely insulated; the pixel display unit of edge display can be heated radiated and conducted outwards; the LED flexible circuit of edge display is leaded from the front side of liquid crystal panel with backlight to its back side, and connected with corresponding driving circuit and control circuit; and the LED of pixel display unit in the edge display is of convertibility and maintainability.

The LED implanted on the flexible circuit is served as the pixel display unit of edge display, three primary colors encapsulation LED particles are soldered on the flexible circuit, or LED three primary colors chip is bounded directly and encapsulated on the Chip On board (COB) for the implantation mode, which depends on the design density of LED pixel. If encapsulation LED particles are soldered on the flexible circuit, the pixel pitch of edge display can reach 1~1.5 mm; if using COB the pixel pitch of edge display can be smaller than 1 mm, which is very close to that of liquid crystal display screen for splicing. Even for the 1~1.5 mm pixel pitch of the encapsulation LED particles, when the liquid crystal display screen is spliced into 2 rows and 2 columns, the actual display pixel is basically the same with the pixel display effect of liquid crystal display screen (the pixel pitch of splicing liquid crystal display screen is about 0.7 mm generally).

The LED of encapsulation mode or COB mode and OLED referred to are collectively known as display unit LED. Meanwhile, PDP is with black border/bezel as the liquid crystal display screen, so the scheme of the present invention is also applied to PDP, the implementation of the present invention on the liquid crystal display screen is also applied to that on the PDP, which is collectively known as liquid crystal display screen.

Figure 19:
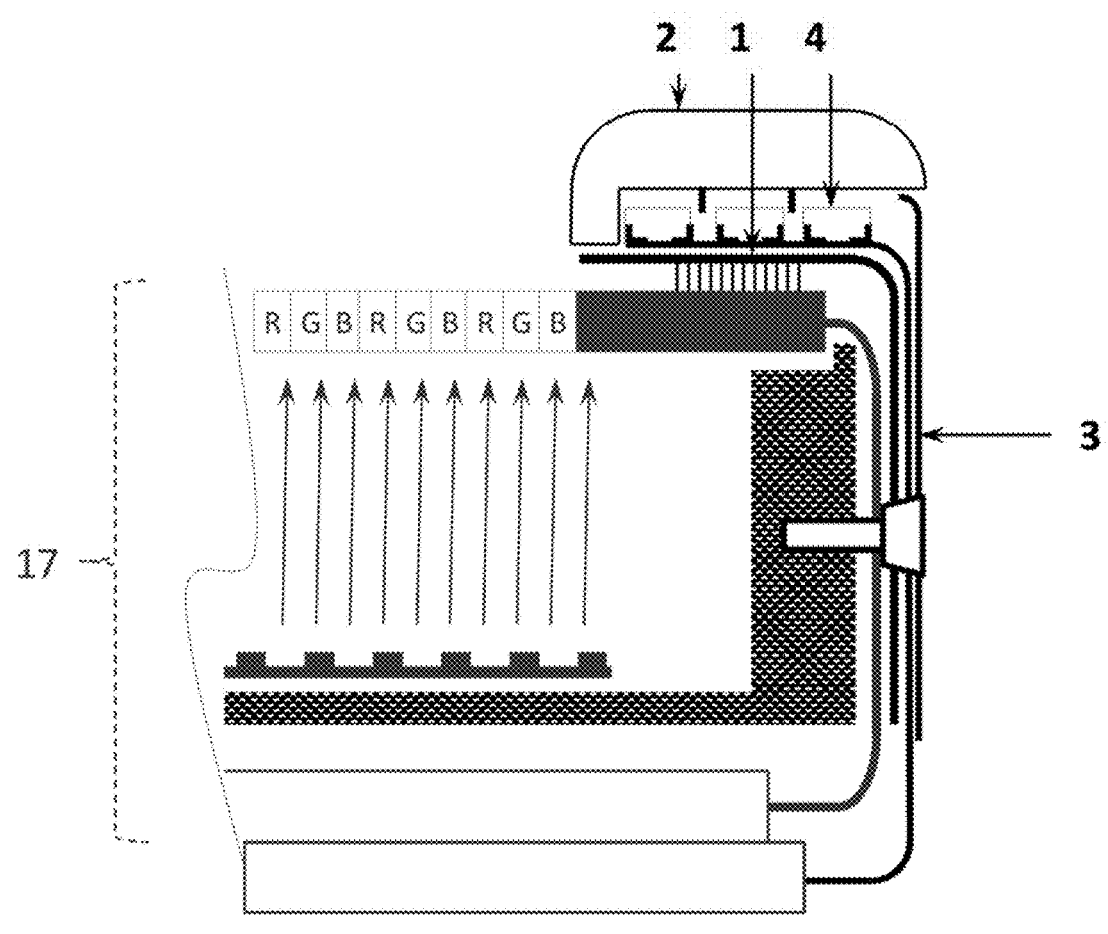
FIG. 19 is a composite structure diagram of the inner frame, the dodging layer, the display unit and the outer frame according to the present invention.
Figure 20:
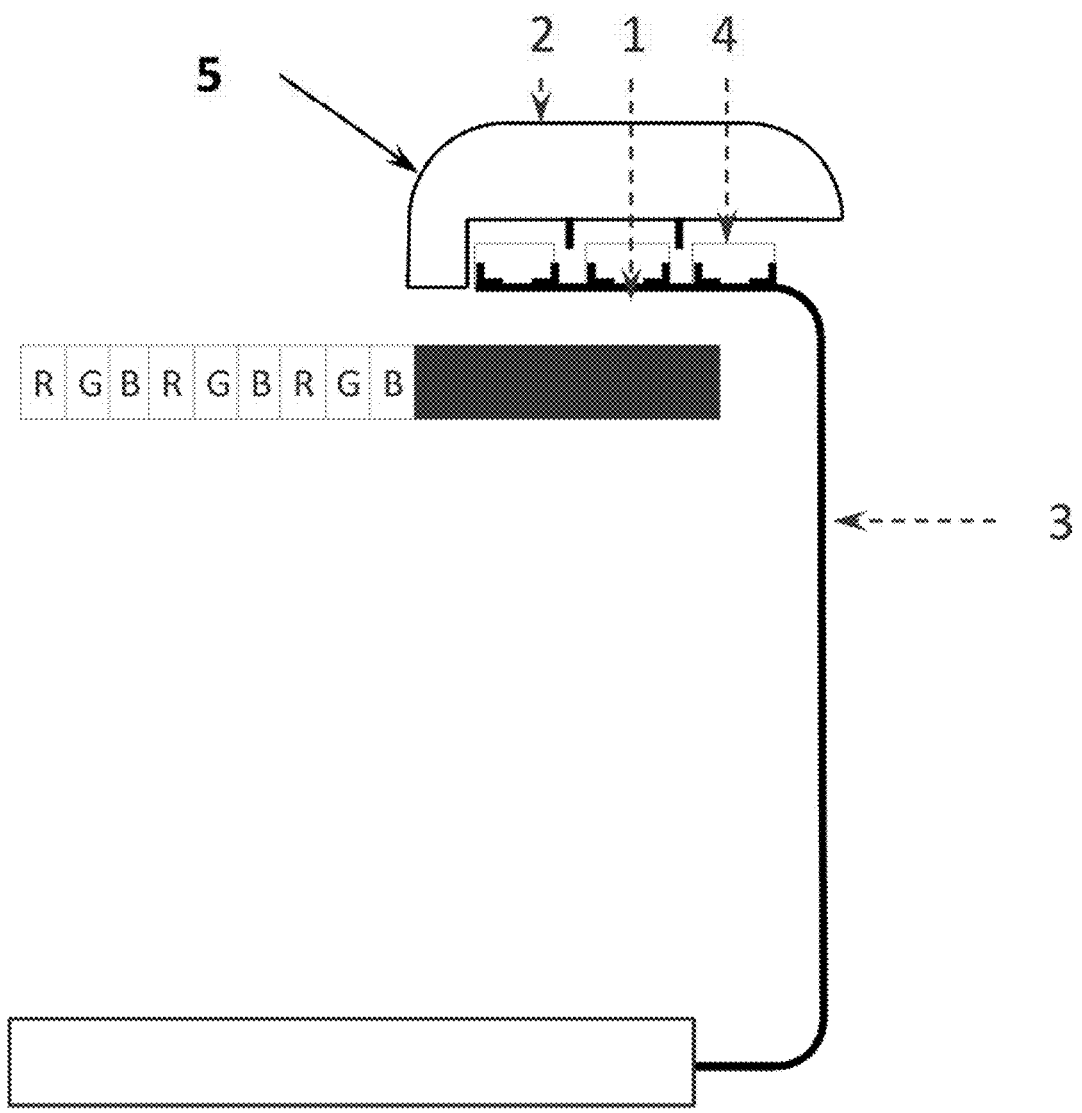
FIG. 20 is an arc structure diagram of the inner edge and outer edge of the dodging layer according to the present invention.
Figure 21:
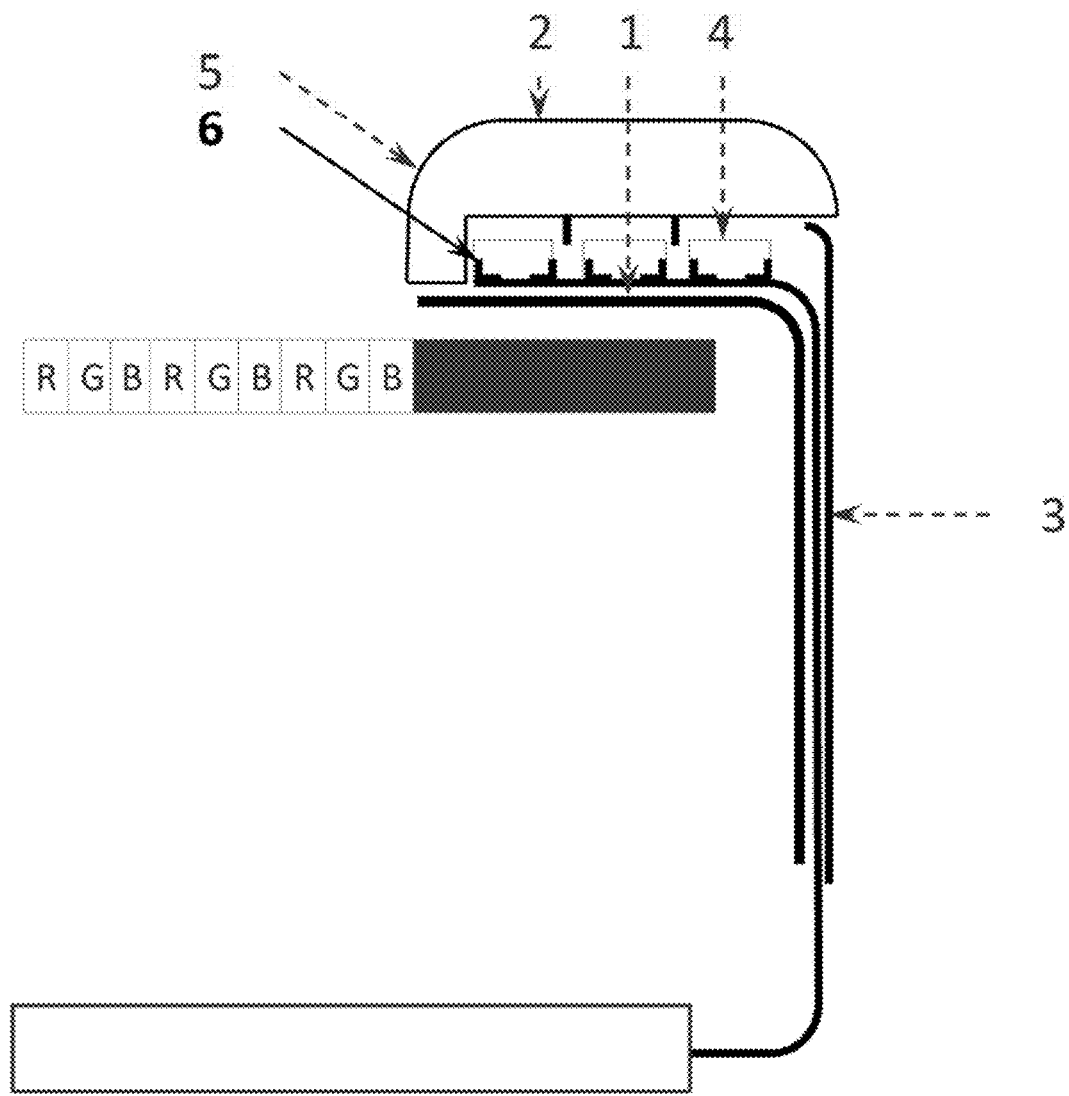
FIG. 21 is a structure diagram for pin insulation of LED display unit according to the present invention.

The present invention provides a scheme for constructing edge display with following characteristics. Edge display is made up of an inner frame 1 dodging layer 2 an outer frame 3, and it can put the display unit LED and flexible circuit 4 inside, as FIG. 19 shown; the dodging layer covers the display unit LED, an arc 5 is arranged on the inner edge and outer edge of the dodging layer, so that the LED display pixel is the same brightness on the display surface of the dodging layer, as FIG. 20 shown; the dodging layer is made up of black, transparent, thin shelled and long strips of the dodging body, so that the black can be expressed when the black elements need to be expressed in the originally input video; the dodging layer is made up of insulated material and wrapping up the naked part of display unit LED circuit, so that LED pin (and solder point) 6 are insulated, as FIG. 21 shown.

Figure 22:
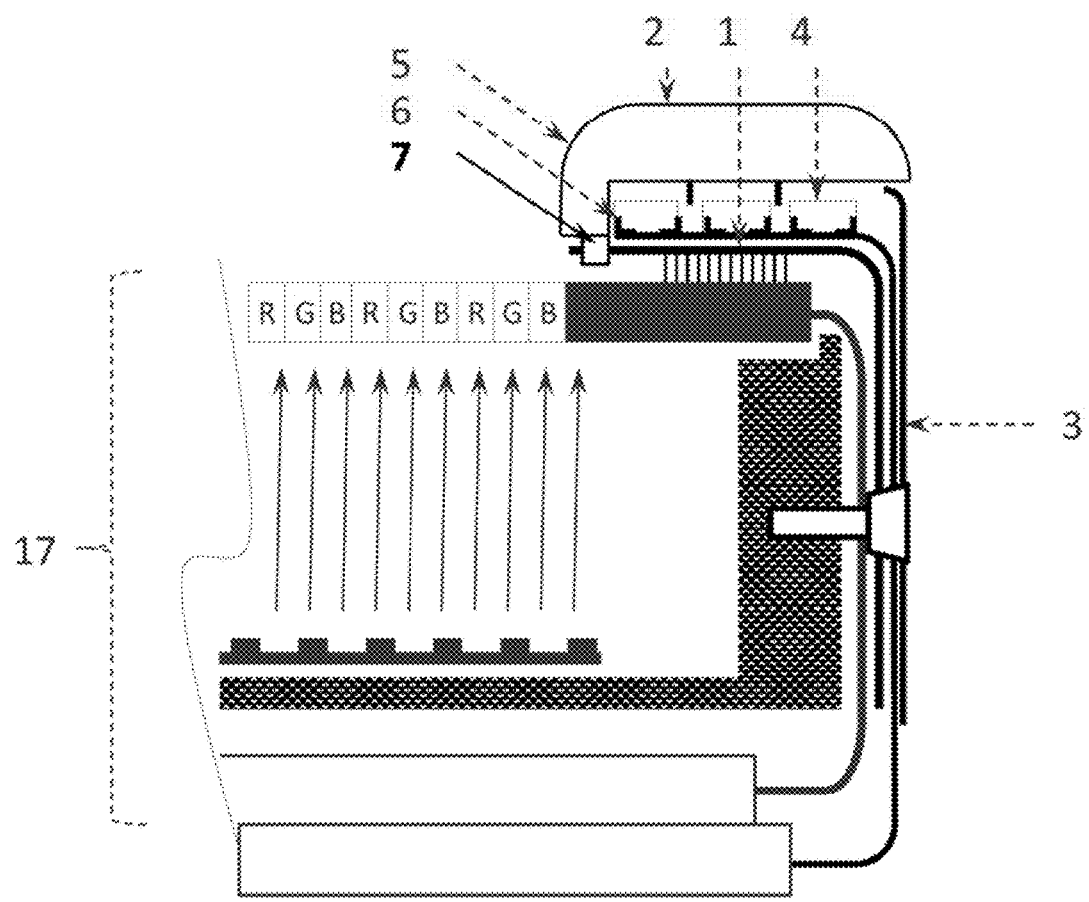
FIG. 22 is a structure diagram for stitch of the inner bottom of the dodging layer according to the present invention.
Figure 23:
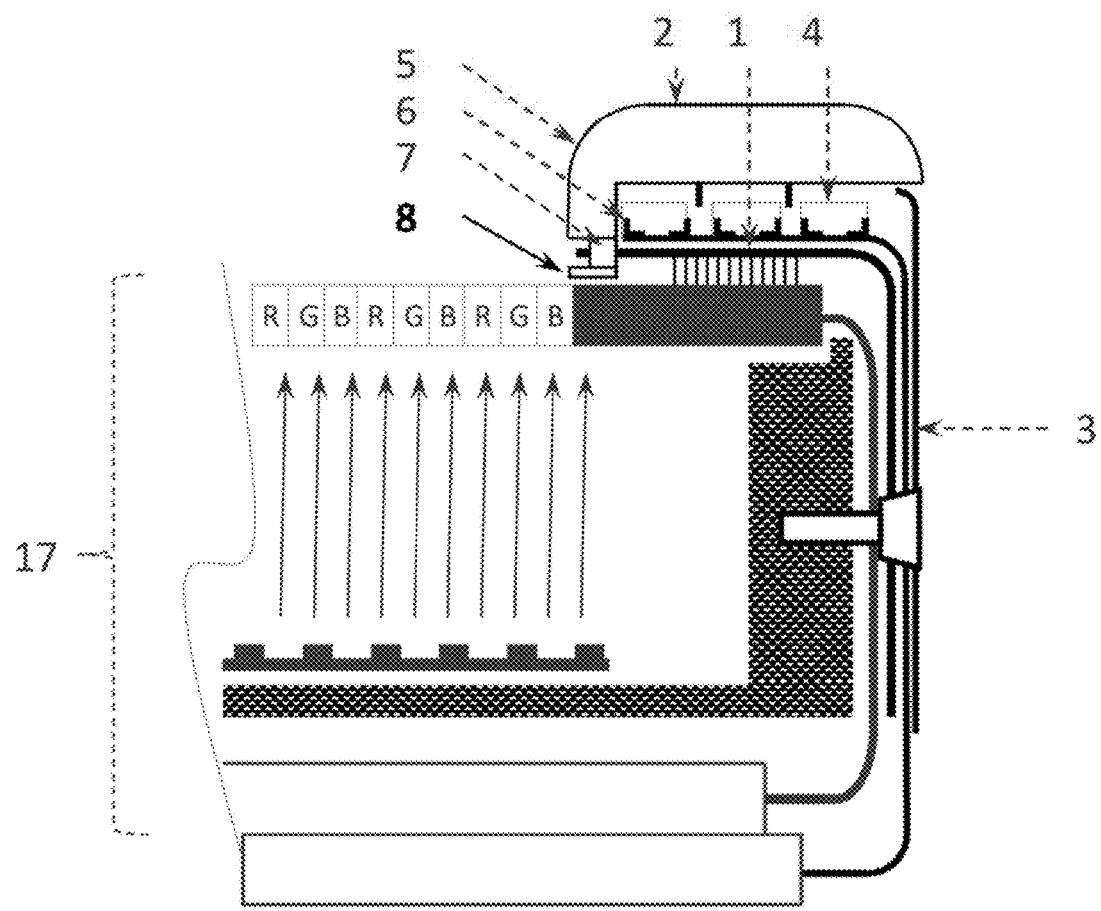
FIG. 23 is a structure diagram of passing through the through-hole of inner frame by stitch of dodging layer and thermo-compression bonding.
Figure 24:
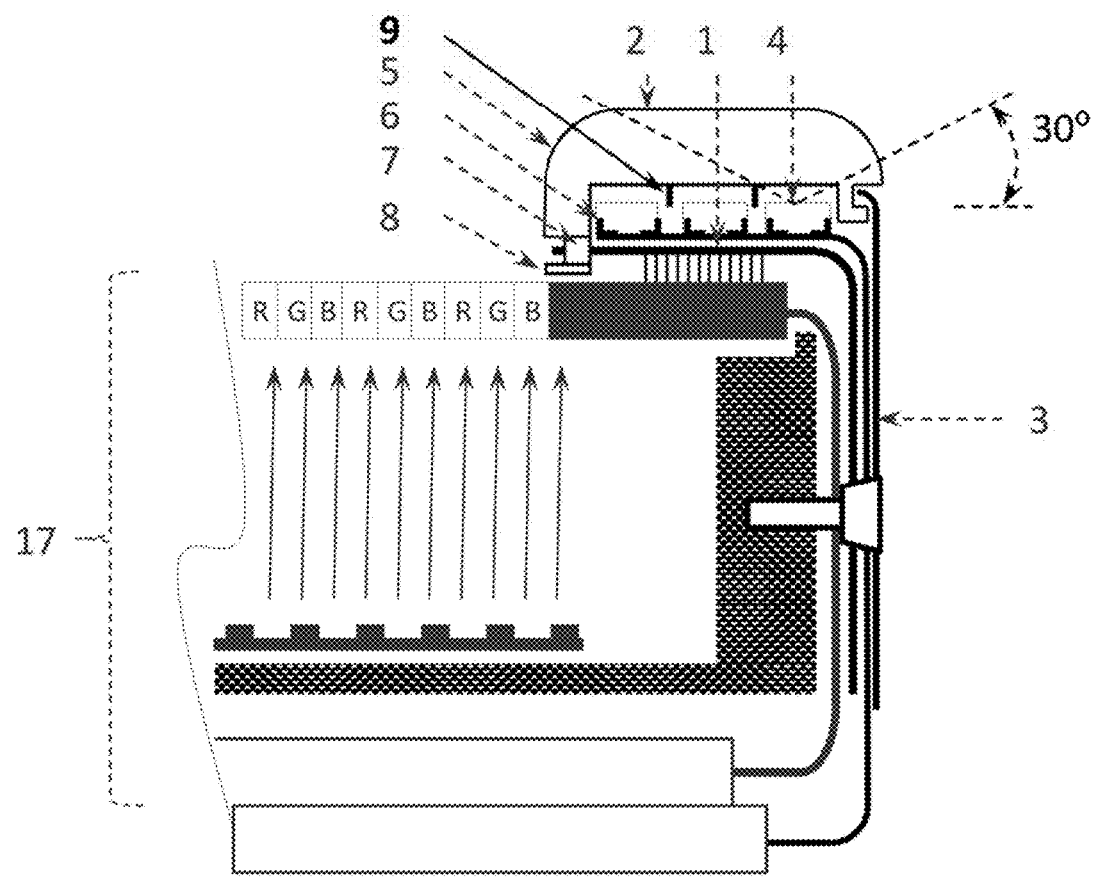
FIG. 24 is a structure diagram for clamping of inner top of the dodging layer according to the present invention.
Figure 25:
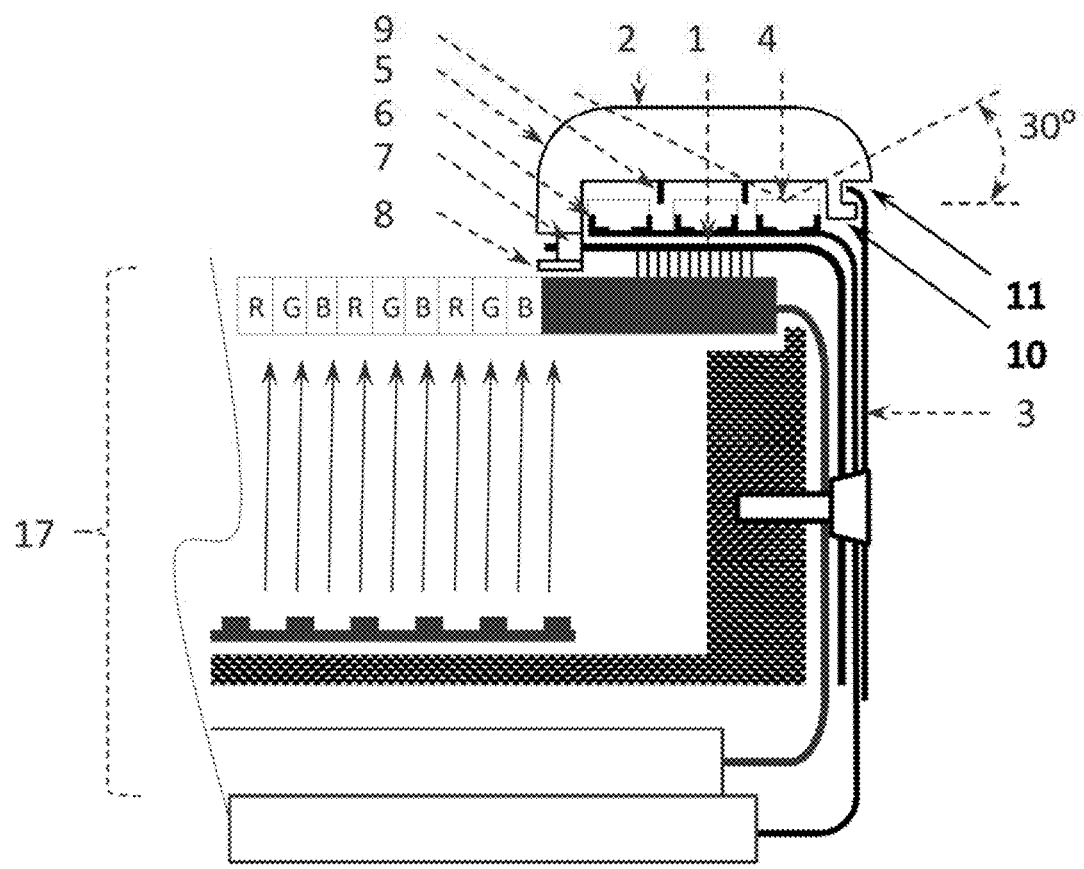
FIG. 25 is a structure diagram of fastening the groove of outer side face of dodging layer with the dodging layer according to the present invention.
Figure 26:
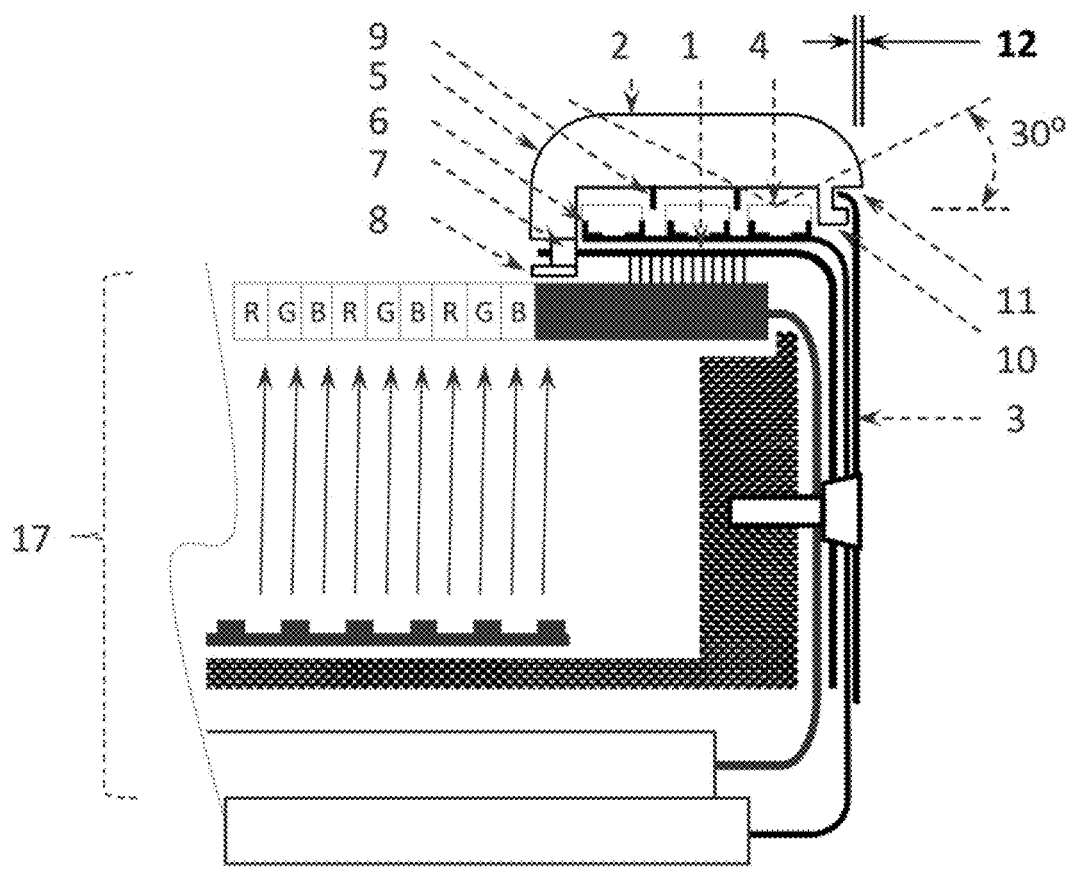
FIG. 26 is a diagram of display boundary surface for outer frame smaller than the dodging layer after fastening.

A pin 7 is arranged on the inner bottom of the dodging layer as per certain distance, as FIG. 22 shown, the through-hole with equivalent space are arranged on the inner frame of the composite frame, the pin of the dodging layer is passing through the through-hole of the inner frame, and bonded with thermo-compression, as FIG. 23 shown, so that the inner frame is completely within the display interface of the dodging layer, and the relative position of the dodging layer and the inner frame are located; a series of clamping 9 are arranged on the inner top of the dodging layer, and is arranged beyond the included angle of 120 degrees between outside and bottom of LED illuminant of edge display unit, the relative position of the display unit and the dodging layer, LED and the inner frame are located, as FIG. 24 shown; a groove 10 is arranged on the outer side face of the dodging layer, the groove is arranged beyond the included angle of 120 degrees between outside and bottom of LED illuminant of edge display unit, the display of LED pixel will not be covered, as FIG. 25 shown.

The outer frame of composite frame and the groove of the dodging layer are connected by a fastening 11, as FIG. 25 shown after the fastening of the outer frame of composite frame and the groove of the dodging layer, the largest outer diameter is smaller than display outer edge diameter 12 defined by the dodging layer, so that the edges between the dodging layer after splicing are completely meshed, as FIG.

Figure 27:
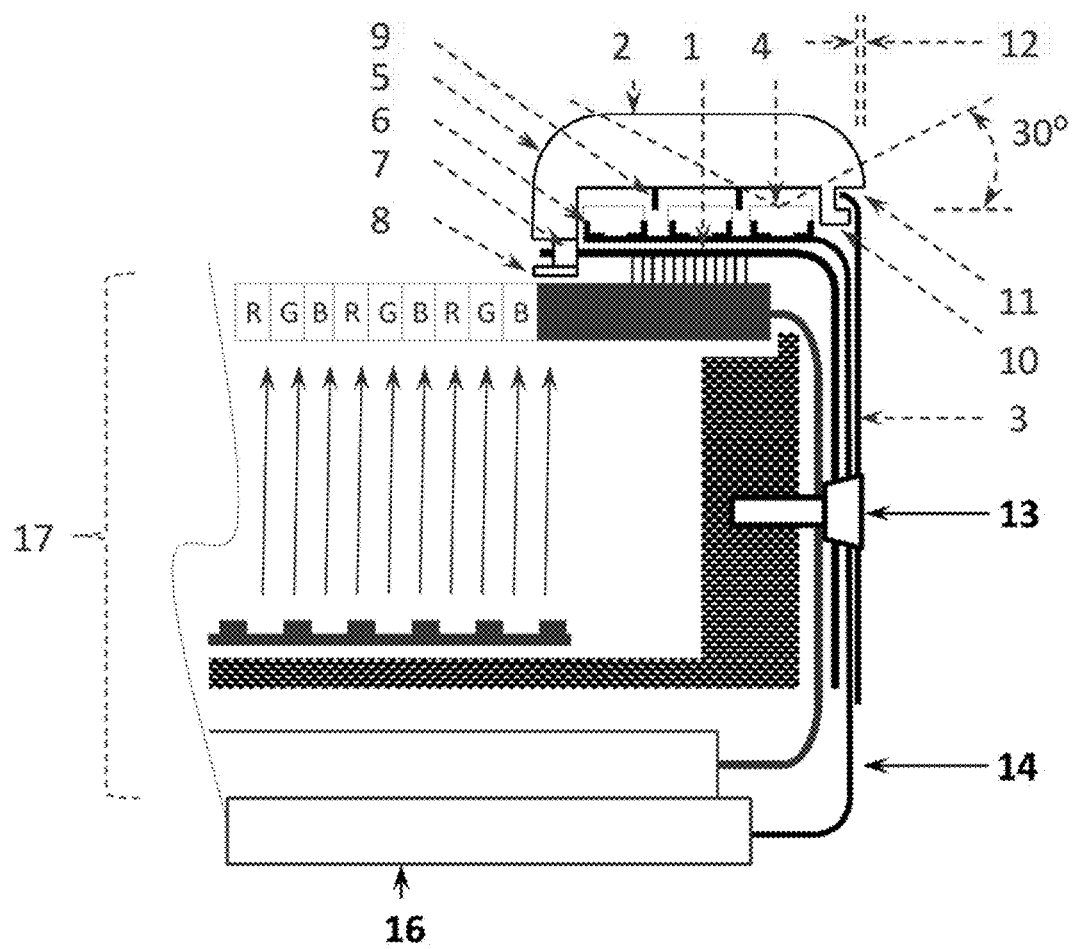
FIG. 27 is a structure diagram of fixing the inner frame, the dodging layer LED flexible circuit and the outer frame on liquid crystal display panel and leading LED flexible circuit to the back of liquid crystal display panel.
Figure 28:
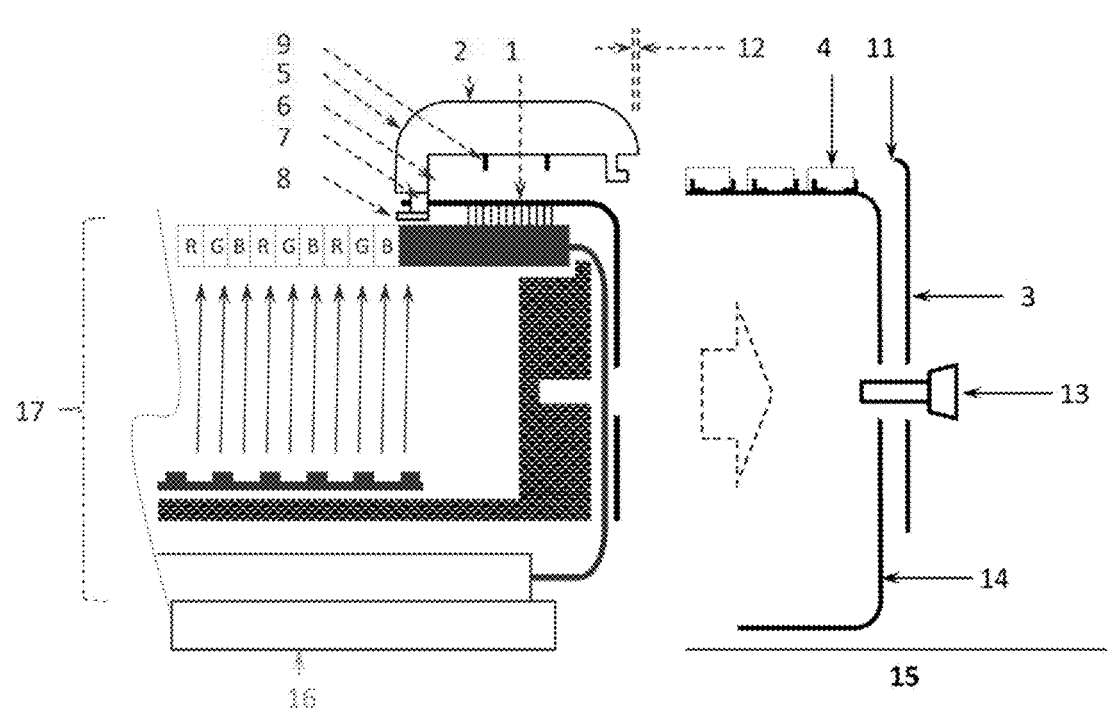
FIG. 28 is a structure diagram of replacing and maintaining LED edge display unit and flexible circuit according to the present invention.

26 shown; a coordinating through-hole is arranged on the installation position of liquid crystal panel of the inner frame, LED flexible circuit, and the outer frame, so that the inner frame, LED flexible circuit, and the outer frame are fixed on the liquid crystal panel 17 by a fixed bolt 13, the positional correspondence between the display unit LED pixel and display pixel of liquid crystal display screen is located as FIG. 27 shown, so that the display surface of the dodging layer and LED display surface are parallel with liquid crystal display surface respectively; the width of originally black border/bezel is completely covered by the dodging layer as edge display, and the dodging layer is with characteristics of keeping liquid crystal glass on the liquid crystal panel 17; after the compression of the inner frame and the dodging layer, the fastening of the outer frame and the dodging layer, the display unit LED flexible circuit is leaded from the front side of the liquid crystal panel 17 to its back side, and connected with corresponding driving circuit and control circuit 16, as FIG. 27 shown; the display unit LED is compressed on the inner frame through the clamping of the dodging layer, so that LED can conduct main energy through the inner frame (LED is mainly heat conducted by its backside), and all LED display surfaces are equivalent height and brightness with the display surface of the dodging layer; due to fastening mode, the outer frame can be removable, the display unit LED and its flexible circuit can be replaced and maintained, as 15 section of FIG. 28 shown.

We claim:

1. A device for eliminating spliced borders/bezels of liquid crystal display screens by means of edge display, characterized in that the edge display unit is arranged on the spliced border/bezel of the liquid crystal display screen, a dodging layer is arranged on the edge display unit to serve as a display surface of the edge display unit, and the dodging layer and a displayable area of the liquid crystal display screen are synthesized and fused to display an original input video image; the border/bezel of liquid crystal display screen is a composite structure of an inner frame and an outer frame, the dodging layer is black, transparent, thin shelled and long strips of dodging body, the edge display unit is a flexible circuit of LED display unit, the inner bottom of the dodging layer on the edge display unit is connected with the inner frame and the outer side face of the dodging layer on the edge display unit is connected with the outer frame.

2. The device for eliminating spliced borders/bezels of liquid crystal display screens by means of edge display according to claim 1, characterized in that the flexible circuit of LED display unit of edge display unit is leaded from the front side of liquid crystal display panel with backlight to its back side, and it is connected with corresponding driving circuit and control circuit.

3. The device for eliminating spliced borders/bezels of liquid crystal display screens by means of edge display according to claim 1, characterized in that an arc is arranged on an inner edge and an outer edge of dodging layer.

4. The device for eliminating spliced borders/bezels of a liquid crystal display screen by means of edge display according to claim 1, characterized in that a stitch is arranged on the inner bottom of the dodging layer as per certain distance, a through-hole having same interval is arranged on the inner frame of liquid crystal display screen, passing through the through-hole of inner frame, the stitches of dodging layer are thermo-compression bonded with the inner frame.

5. The device for eliminating spliced borders/bezels of liquid crystal display screens by means of edge display according to claim 1, characterized in that a clamping is arranged on inner top of the dodging layer, which locates the relative position of LED of the edge display unit and the inner frame, the clamping is arranged beyond the included angle of 120 degrees between outside and bottom of LED illuminant of edge display unit.

6. The device for eliminating spliced borders/bezels of liquid crystal display screens by means of edge display according to claim 1, characterized in that a groove is arranged on outer side face of the dodging layer, the groove is arranged beyond the included angle of 120 degrees between outside and bottom of LED illuminant of edge display unit.

7. The device for eliminating spliced borders, bezels of liquid crystal display screens by means of edge display according to claim 1, characterized in that the largest outer diameter for superimposed thickness of inner frame, LED flexible circuit of edge display unit and outer frame is smaller than display edge of the dodging layer.

8. The device for eliminating spliced borders/bezels of liquid crystal display screens by means of edge display according to claim 1, characterized in that the outer frame of composite frames and the outer groove of the dodging layer are connected by a fastening.

9. The device for eliminating spliced borders/bezels of liquid crystal display screens by means of edge display according to claim 1, characterized in that a coordinating through-hole of the inner frame, LED flexible circuit of the edge display unit and the outer frame is arranged on the installation position with backlight liquid crystal panel, the inner frame, LED flexible circuit of the edge display unit and the outer frame is fixed on the liquid crystal panel with backlight by a fixed bolt in the coordinating through-hole.

10. The device for eliminating spliced borders/bezels of a liquid crystal display screens by means of edge display according to claim 9, characterized in that the backside of LED flexible circuit of the edge display unit is closely attached on the inner frame.

11. The device for eliminating spliced border/bezel of liquid crystal display screens by means of edge display according to claim 9, characterized in that the conducting region of LED flexible circuit of the edge display unit is wrapped up by the dodging layer, so that LED flexible circuit of the edge display unit is insulated.

* * * * *